(12) United States Patent
Micheli

(10) Patent No.: US 8,079,628 B2
(45) Date of Patent: Dec. 20, 2011

(54) DEPLOYMENT ASSEMBLY AND A SELECTIVELY MOVABLE ASSEMBLY

(75) Inventor: John Micheli, Dearborn, MI (US)

(73) Assignee: John Micheli

( * ) Notice: Subject to any disclaimer, the term of this patent is extended or adjusted under 35 U.S.C. 154(b) by 0 days.

(21) Appl. No.: 12/661,933

(22) Filed: Mar. 26, 2010

(65) Prior Publication Data

US 2011/0233954 A1 Sep. 29, 2011

(51) Int. Cl.
*B60R 3/00* (2006.01)

(52) U.S. Cl. .......................... 296/62; 296/57.1

(58) Field of Classification Search .................. 296/55, 296/57.1, 59, 60, 62, 146.8, 186.3, 186.4, 296/61; 414/537
See application file for complete search history.

(56) References Cited

U.S. PATENT DOCUMENTS

| | | | |
|---|---|---|---|
| 3,930,680 A | 1/1976 | Littlefield | |
| 4,108,458 A | 8/1978 | Owens | |
| 4,180,143 A | 12/1979 | Clugston | |
| 5,150,762 A | 9/1992 | Stegman | |
| 5,205,603 A | 4/1993 | Burdette | |
| 5,401,056 A | 3/1995 | Eastman | |
| 5,513,866 A | 5/1996 | Sisson | |
| 5,678,872 A * | 10/1997 | Slater | 293/118 |
| 5,678,984 A * | 10/1997 | Petersen | 414/537 |
| 5,716,064 A | 2/1998 | Frerichs | |
| 5,738,362 A | 4/1998 | Ludwick | |
| 5,803,475 A | 9/1998 | Zdick | |
| 5,803,523 A | 9/1998 | Clark | |
| 5,897,125 A | 4/1999 | Bundy | |
| 6,199,894 B1 | 3/2001 | Anderson | |
| 6,237,927 B1 | 5/2001 | Debo | |
| 6,241,312 B1 | 6/2001 | Watts et al. | |
| 6,474,668 B2 | 11/2002 | Debo | |
| 6,488,327 B1 | 12/2002 | Pearse et al. | |
| 6,834,903 B2 * | 12/2004 | Harper et al. | 296/51 |
| 6,913,305 B1 * | 7/2005 | Kern et al. | 296/51 |
| 7,232,173 B2 * | 6/2007 | Katterloher et al. | 296/50 |
| 7,252,168 B2 | 8/2007 | Lin | |
| 7,350,842 B2 | 4/2008 | Leblanc | |
| 7,441,809 B1 | 10/2008 | Coombs | |
| 2001/0035625 A1 | 11/2001 | Debo | |
| 2005/0252720 A1 | 11/2005 | Chant | |
| 2008/0106106 A1 * | 5/2008 | Lavoie | 293/117 |

FOREIGN PATENT DOCUMENTS

WO WO 93/01987 2/1993

* cited by examiner

*Primary Examiner* — Dennis Pedder
*Assistant Examiner* — Jason S Daniels
(74) *Attorney, Agent, or Firm* — John G. Chupa

(57) ABSTRACT

A deployment assembly 16 which selectively and efficiently allows entry and exit into and from the bed 12 of a selectively movable assembly and which includes a plurality of independently movable stair assemblies 202, 204, 206 which may be respectively extended and retracted and then placed in a stored upright position to cooperatively form a tailgate.

7 Claims, 15 Drawing Sheets

DEPLOYMENT ASSEMBLY AND A SELECTIVELY MOVABLE ASSEMBLY

FIELD OF THE INVENTION

The present inventions generally relate to a deployment assembly and a selectively movable assembly, and more particularly to a deployment assembly which is adapted to be selectively and movably deployed upon a selectively movable assembly and which allows for the relatively efficient and selective movement into and out of the selectively movable assembly, and to a selectively movable assembly having these benefits.

BACKGROUND OF THE INVENTION

Selectively movable assemblies, such as a truck or a personnel carrier, are adapted to carry people and/or other items to various locations. It should be appreciated that the term "selectively movable assembly", as used throughout the entirety of this document, is mean to refer to any assembly which may be selectively moved, such as by way of example and without limitation, an automobile, a truck, trailer, or a hybrid vehicle. Nothing is meant to limit the applicability of the various inventions to a particular type of selectively movable assembly.

While these assemblies do transport people and/or items, they do not readily allow the transported people and/or items to easily and efficiently enter and exit the assembly. Such efficient egress and ingress is particularly important in several environments, such as upon a battlefield setting where it is very desirable to allow troops to enter and exit a personnel transport assembly in a highly efficient manner.

The present inventions overcome the foregoing drawbacks and provide other highly desirable benefits.

SUMMARY OF THE INVENTION

It is a first non-limiting object of the present invention to provide a deployment assembly which overcomes the various drawbacks associated with prior deployment assemblies and which allows for the efficient and selective movement into and out of a selectively movable assembly.

It is a second non-limiting object of the present invention to provide a selectively movable assembly which allows for the efficient ingress and egress into and out of the assembly.

According to a first non-limiting aspect of the present invention, a deployment assembly is provided and includes a mounting portion; a receiver portion which is movably attached to the mounting portion; and a platform assembly which is attached to the mounting portion and which is movable from a first extended position remote from the mounting portion to a second retracted position in which the platform assembly overlays the mounting portion.

According to a second non-limiting aspect of the present invention, a deployment assembly is provided and includes a mounting plate; a receiver portion which is movably coupled to the mounting plate and which is selectively rotatable with respect to the mounting plate; and a plurality of stair assemblies which are coupled to the receiver portion and which are each independently and selectively movable from a respective first retracted position to a second extended position, and which are further each independently rotatable about the mounting plate in either one of the two respective positions.

According to a third non-limiting aspect of the present invention, a deployment assembly is provided and includes a mounting plate having first and second flat opposed surfaces and wherein a plurality of generally tubular projections are formed upon the first flat surface and wherein the plurality of generally tubular projections each include a flange and each of the flanges are substantially identical, are deployed above the first surface, and are aligned; a receiver portion having a first generally tubular member which includes a plurality of hinges and wherein each of the plurality of hinges respectively receives a unique on of the flanges, effective to allow the receiver to selectively rotate toward and away from the mounting plate and wherein the receiver further including a plurality of substantially identical hollow projections, wherein each of the plurality of substantially identical hollow projections being respectively proximate to a unique one of the hinges and having respective axes of symmetry which are parallel to the first flat surface; and a step assembly having first and second projections which are respectively deployed within a first and a second of said plurality of substantially hollow projections and further having third and fourth members which are respectively received by and movably coupled to the first and second projections and which are movable from a respective first position in which the third and fourth members are respectively and wholly received by the first and second projections to a second extended position in which the third and fourth projections are respectively extended from the first and second projections, and wherein the step assembly further include a plurality of steps which are coupled to the third and fourth projections.

According to a fourth non-limiting aspect of the present invention, a selectively movable assembly is provided and includes a bed; and a deployment assembly which is coupled to the bed and comprising a mounting plate; a receiver portion which is movably coupled to the mounting plate and which is selectively rotatable with respect to the mounting plate; and a plurality of stair assemblies which are coupled to the receiver portion and which are each independently and selectively movable from a respective first retracted position to a second extended position and which are each independently rotatable about the mounting plate in either one of the two respective positions.

These and other features, aspects, and advantages of the various present inventions will become apparent from a reading of the detailed description of the preferred embodiment of the inventions, including the subjoined claims, and by reference to the enclosed drawings which form an integral part of this descriptions.

DETAILED DESCRIPTION OF THE PREFERRED EMBODIMENT OF THE INVENTIONS

Figure 1:
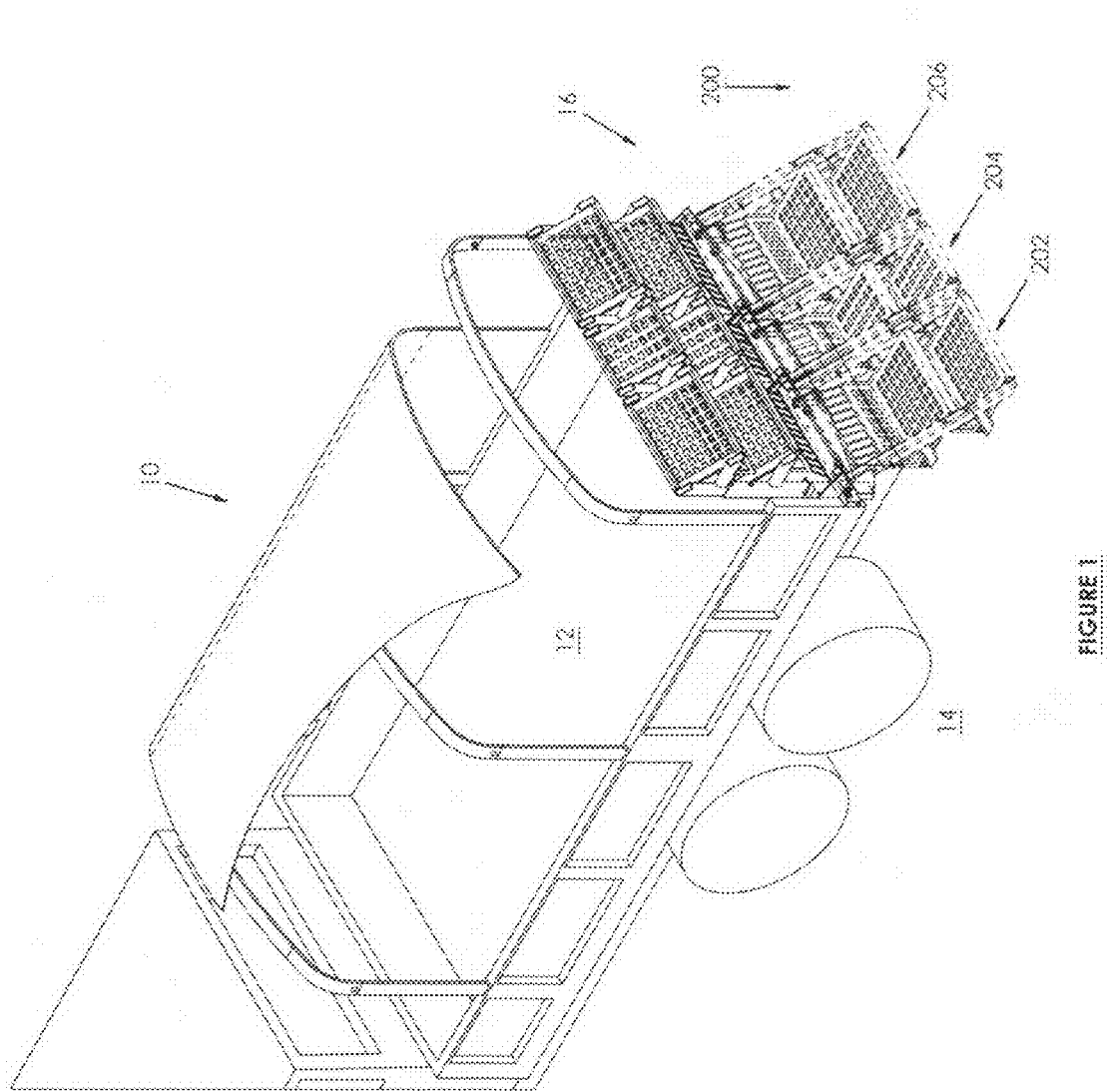
FIG. 1 is a perspective view of a selectively movable assembly having a deployment assembly which is made in accordance with the teachings of the preferred embodiment of the invention.
Figure 2:
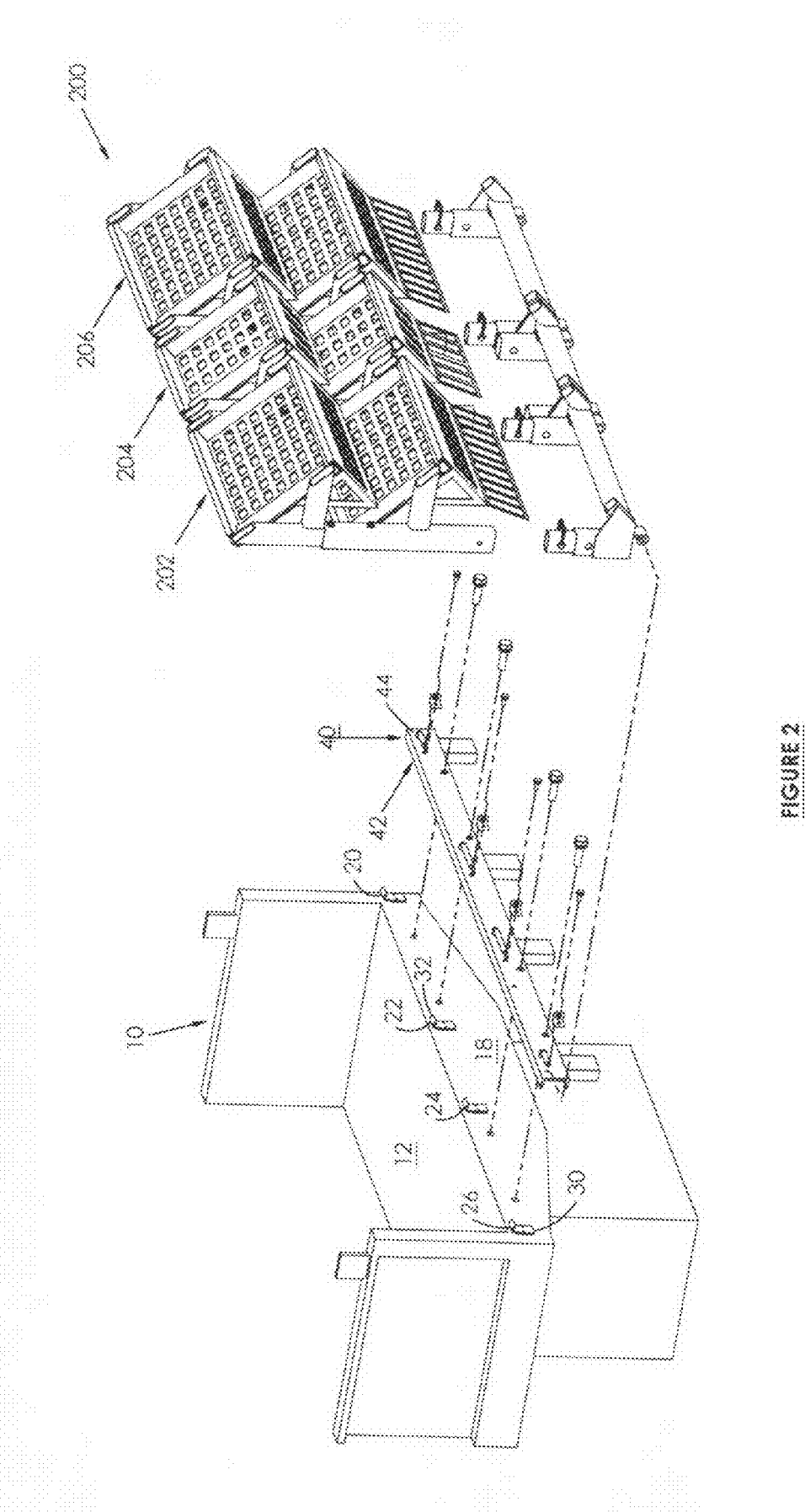
FIG. 2 is a perspective unassembled view of the deployment assembly which is shown in FIG. 1.
Figure 3:
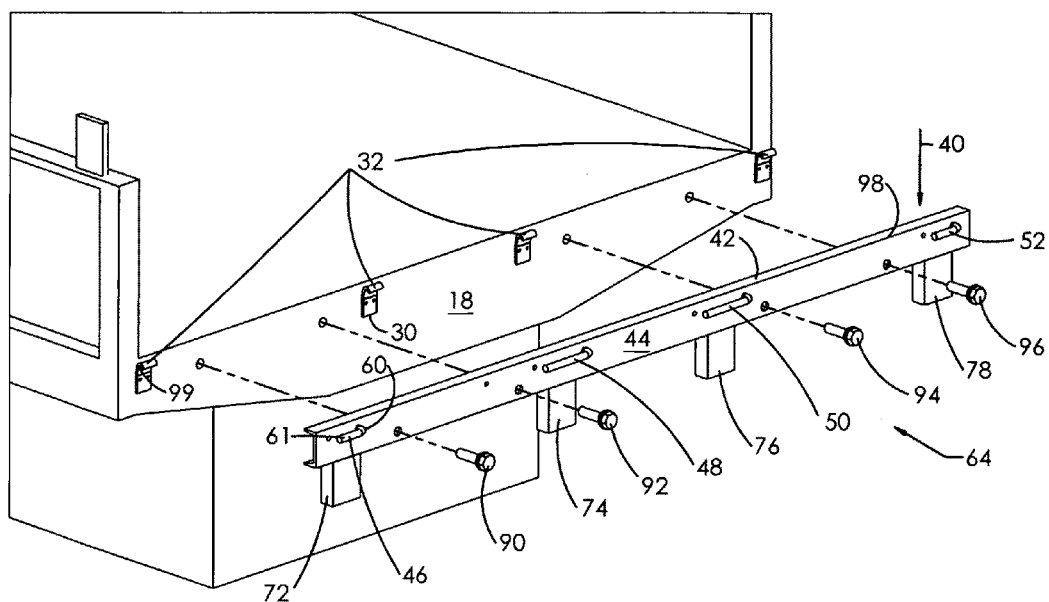
FIG. 3 is an exploded perspective view of a portion of the deployment assembly which is shown in FIG. 2.
Figure 4:
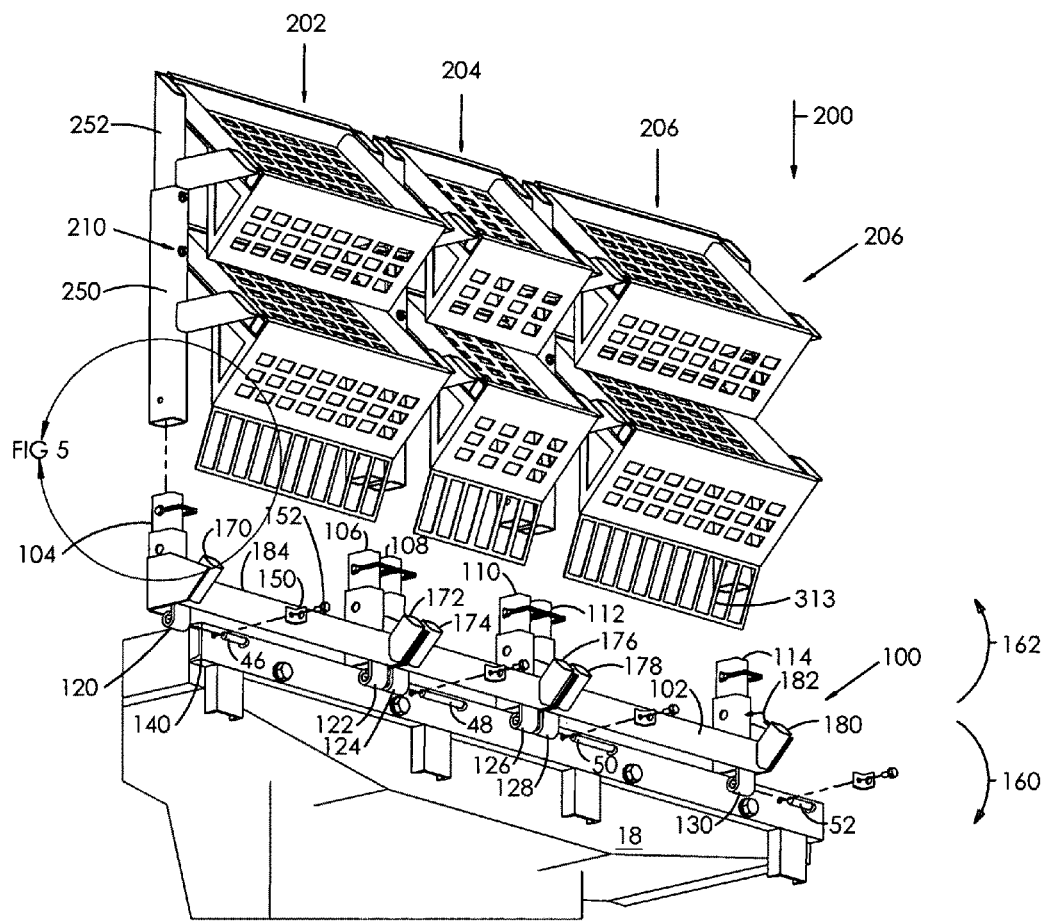
FIG. 4 is an exploded view of a second portion of the deployment assembly which is shown in FIG. 2.
Figure 5:
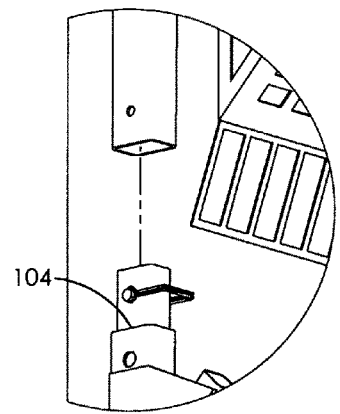
FIG. 5 is an exploded view of a portion of the deployment assembly which is shown in FIG. 4, and takes within view area "5".
Figure 6:
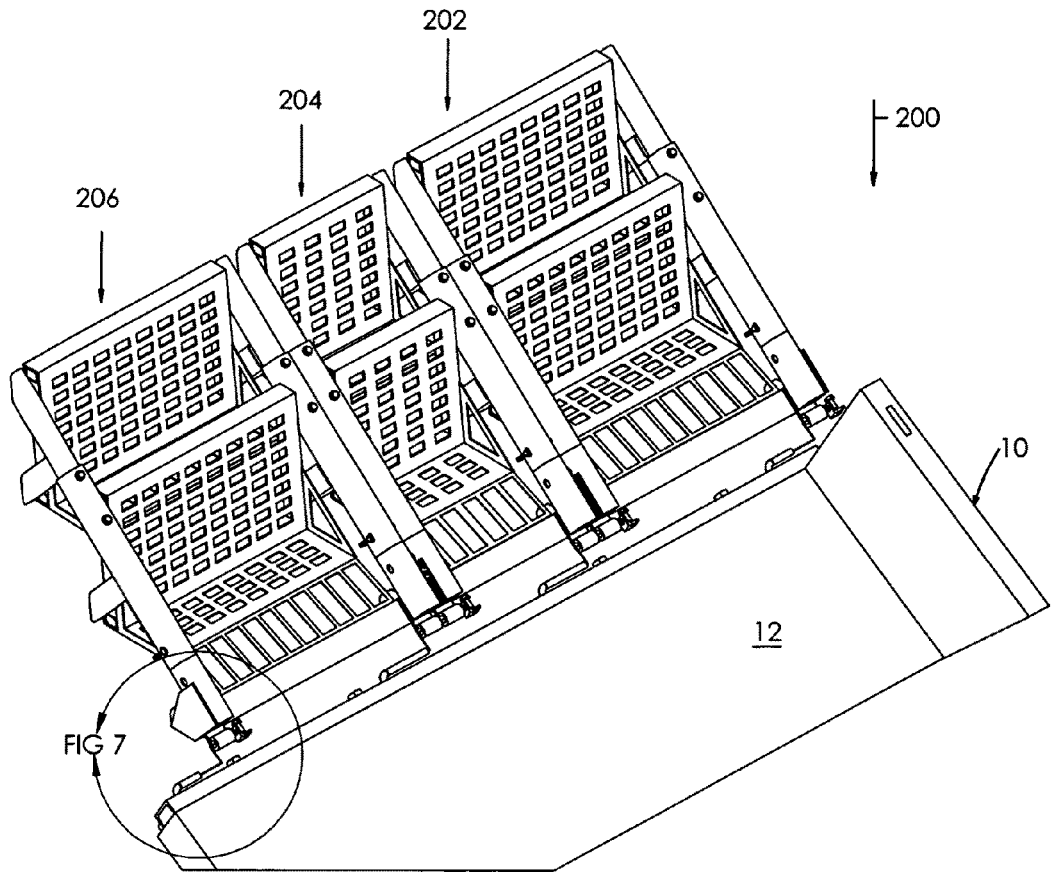
FIG. 6 is a partial view of the stairs assembly portion of the deployment assembly which is shown in FIG. 1 and shown in a selective extended position.
Figure 7:
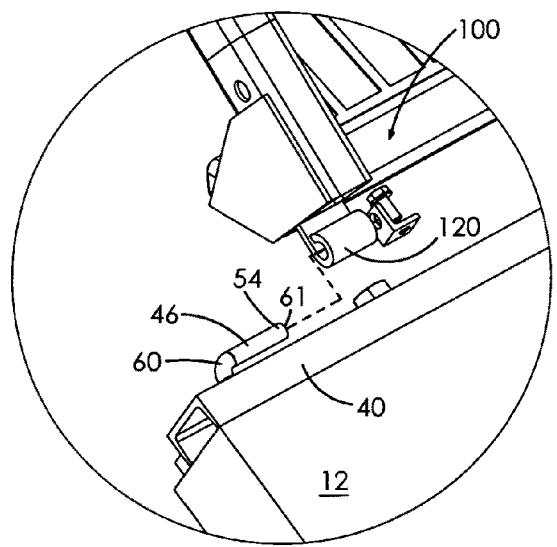
FIG. 7 is an exploded view of a portion of the stairs assembly shown in FIG. 6 and taken within view area "7".
Figure 9:
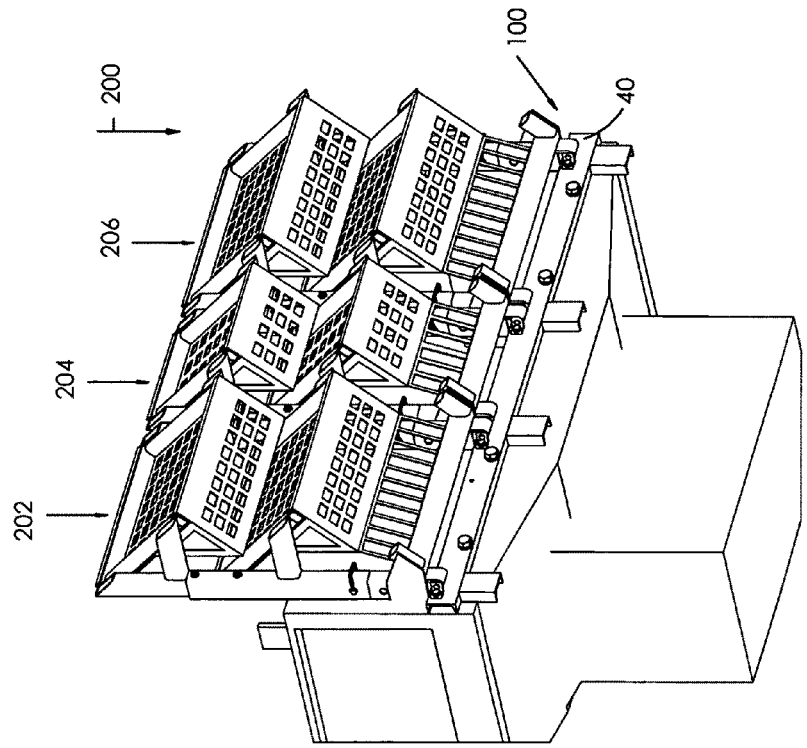
FIG. 9 is an assembled perspective view of the deployment assembly which is shown in FIG. 1 and which is selectively placed in a retracted and/or stored position.
Figure 8:
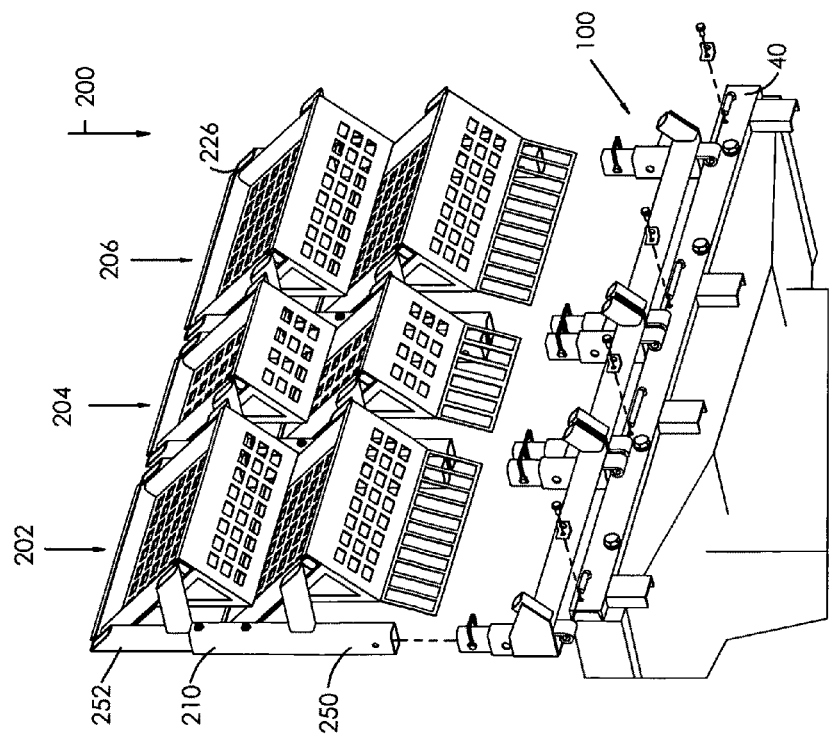
FIG. 8 is an unassembled perspective view of the deployment assembly which is shown in FIG. 1.
Figure 10:
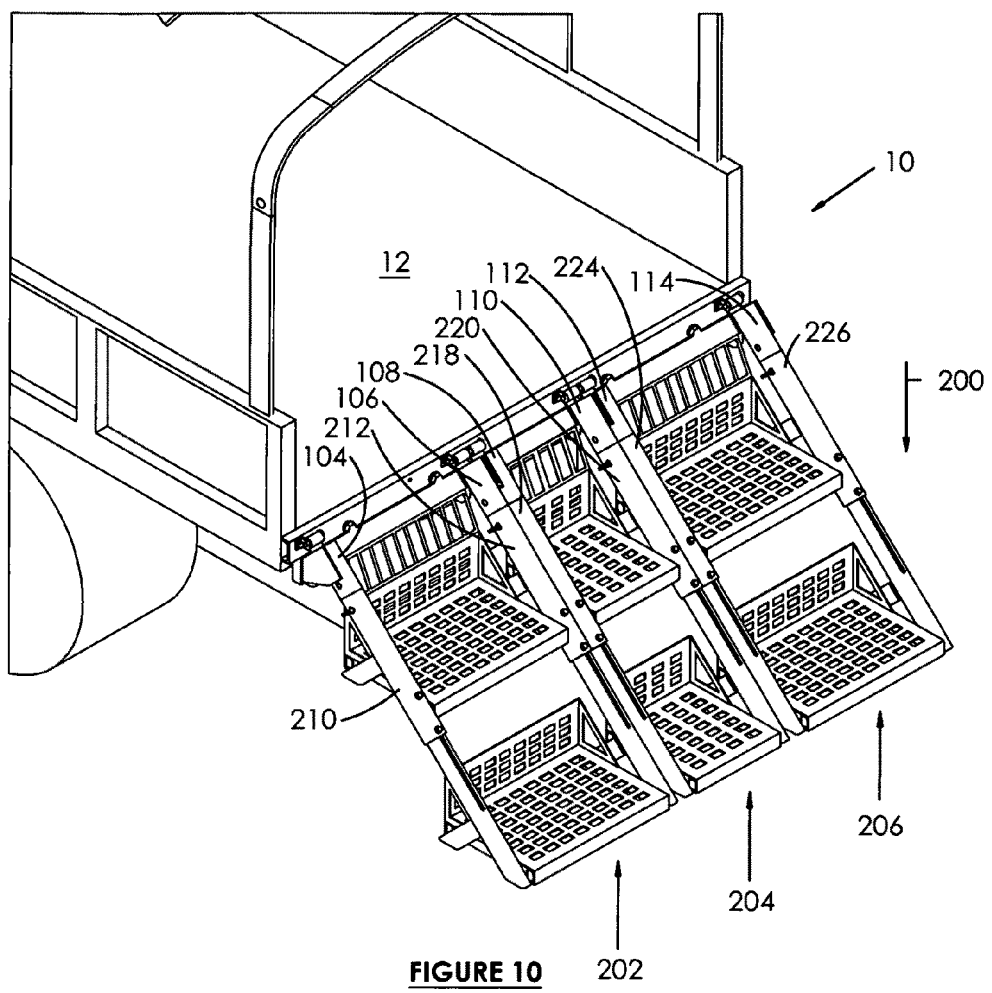
FIG. 10 is a partial perspective view of the selectively movable assembly which is shown in FIG. 1 and further showing the deployment assembly in a selectively extended position and in a maximum entry/exit capacity configuration.

Referring now to FIG. 1, there is shown a selectively movable assembly 10 which is made in accordance with the teachings of the preferred embodiment of the invention. The assembly 10 includes a bed 12 upon which items and/or people may reside and the assembly 10 is adapted to be selectively movable upon some ground or surface, such as ground or surface 14. The bed 12 is positioned above the ground or surface 14 and ingress and egress into and from or out of the bed 12 is desired to be accomplished in an efficient manner and is, in fact, accomplished in this efficient manner by the various inventions described within this Application. Assembly 10 may and does represent any type of assembly which is selectively movable, and the assembly 10 includes a deployment assembly 16 which is made in accordance with the teachings of the present inventions and this deployment assembly 16 allows for efficient entry into and exit from the assembly 10 (e.g., from the bed portion 12 or other portions of the assembly 10). Further, as is perhaps best shown in FIG. 2, the assembly 10 includes a generally flat surface 18 upon which a tailgate assembly (not shown) is normally and movably coupled. That is, surface 18 includes a plurality of substantially identical and equidistantly spaced clips 20, 22, 24, and 26 which normally and movably coupled the tailgate (not shown) to the surface 18. Each of the clips 20-26 includes a flat body 30 which is fastened to the surface 18 and a rounded or hooked top portion 32.

As is perhaps best shown in FIGS. 1-23, the deployment assembly 16 includes a generally flat universal mounting plate 40 having a first portion 42 with a generally "C-shaped" cross sectional area and a flat outer surface or face 44. Upon this outer surface or face 44 are positioned and formed a plurality of substantially identical "L-shaped" reception hooks or members 46, 48, 50, and 52 which respectively have a generally tubular body 61 which is positioned above the surface 44. Each member 46-52 respectively includes a rounded or curved connecting portion 60 which is integrally formed with or coupled to the surface 44 and each connecting portion 60 is integrally formed with or is coupled to a portion 61 and is effective to position the portion 61 above the surface 44. Each portion 61 lies along the same axis which is parallel to the surface 44.

The universal mounting plate 40 further includes a second portion 64 which comprises a plurality of generally rectangular support projections 72, 74, 76 and 78 which integrally terminate upon or are coupled to the portion 42 and which are substantially similar and equidistantly disposed upon the portion 42. The universal mounting plate 40 is attached to the surface 18 by bolts 90, 92, 94, and 96 and the top edge 98 of the portion 40 is received by the respective trench 99 formed within each portion 32. Thus, the very same clips 20-26 which are used to secure a tailgate (not shown) upon the surface 18 are used to secure the universal mounting plate 40 upon the very same surface 18. The projections 72-78 structurally strengthen the plate 40 and reduce the likelihood structural of deformation of the plate 40.

The deployment assembly 16 includes a receiver portion 100 having a generally rectangular body portion 102 with a plurality of generally rectangular and hollow projections 104, 106, 108, 110, 112, and 114. Projections 104, 106, 112, 114 are substantially identical and projections 108 and 110 are substantially identical. Alternately, projections 104-114 may all be substantially identical. The deployment assembly 16 further includes a plurality of substantially identical "hook-like" hinges or protrusions 120, 122, 124, 126, 128, and 130 and protrusion 120 receives member 46, protrusions 122, 124 receive member 48, protrusions 126, 128 receive member 50, and protrusion 130 receives member 52. The received members 46, 48, 50, and 52 each have a respective end 140 which extends through the respective protrusion or protrusions 120-

130 in which the respective members 46-52 are received and, in one non-limiting embodiment, each respective and protruding end 140 is received by a member 150 which is fastened to the surface 44 by a bolt 152. In this manner, the members 46-52 are free to selectively and respectively rotate within the protrusions or hooks 120-130 that they are respectively received within, in the directions 160, 162, but will not become dislodged from their position on the plate 40. Further, the receiver portion 100 includes a plurality of hollow and generally rectangular protrusions 170, 172, 174, 176, 178, and 180 which each form a respective acute angle 182 with edge 184 and these protrusions 170-180 act as a "positive stop" and engage the surface 18 when the portion 100 is rotated in the direction 160, thereby cooperatively establishing the maximum amount by which the portion 100 may be rotated in the direction 160.

The deployment assembly 16 further includes a step assembly 200 having a plurality of independently movable step portions 202, 204, 206. Step portion 202 includes generally rectangular and generally hollow members 210, 212 which are adapted to be selectively, frictionally, and removably inserted into the members 104, 106. After such insertion, bolts or other type of fasteners may be used to ensure that such members 210, 212 continue to respectively reside within the members 104, 106 and such bolts or fasteners may be adapted to selectively loosened so as to allow members 210, 212 to be selectively removed from respective members 104, 106. One non-limiting example of such a fastener is a selectively and removably couple member 104 within member 210. In substantially similar fashion, step portion 204 includes generally rectangular and hollow members 218, 220 which are adapted to be selectively, frictionally, and removably inserted into the members 108, 110, and the step portion 206 includes generally hollow members 224, 226 which are adapted to be selectively and frictionally secured within the members 112, 114. Thus, it should be appreciated that once the members 210, 212,218,220,224,226 are so coupled, then the stair assemblies 202, 204, 206 may be selectively and independently rotated with the rotation of the receiver assembly 100 (as previously explained, the receiver assembly 100 may selectively rotate with respect to the universal mounting plate 40). Moreover, each stair assembly 202, 204, 206 may be selectively removed from the assembly 100.

Member 210 includes a first portion 250 and a second portion 260 which is received by and which is movable within the first portion 250. That is, portion 260 is selectively movable from a first position in which the portion 260 substantially resides within the first portion 250 (see, for example, FIG. 18), to a second extended position in which the portion 260 may extend away from or outward of the portion 250 (see, for example, FIG. 11). Member 212 (see, for example, FIG. 18) has respectively similar portions 270, 280. That is, portions 270, 280 are substantially similar to portions 250, 260.

In one non-limiting embodiment, a slit or trench 262 is created within each of the portions 260, 280. Bolts 290, 291 are made to pierce the portion 270 and to movably reside within the respective slit 262 which is created within the portion 270. Similarly, bolts 292, 293 are made to pierce the portion 250 and to movably reside within the respective slit 262 which is created within the portion 250. Thus, when bolts 293,290 are made to respectively contact the edge 299 of the respective slit 262 that they respectively reside within, further retraction movement (in the direction 263) of the step assembly 202 ceases. Similarly, when bolts 291, 292 are made to respectively contact the edge 300 of the respective slit 262 that they respectively reside within, further extended movement of the step assembly (in the direction 301) ceases. The bolts 290,291, reside on a line which defines a path of movement and they also reduce pivotal torque of the member 280 and 270. Bolts 292, 293 provide the same benefits with respect to portions 250, 260. Also, bolts 290, 291,292,293 may be replaced by difficult members.

Further, the step assembly 202 includes steps 310, 312 and each step 310, 312 is generally "L-shaped" and step 310 is fixed between portions 260, 280 while step 312 is fixed between portions 250, 270. Step 312 further includes a flange portion 322 residing between the portions 250, 270. Flange 322 also, when placed in a stored position, prevents items from falling out of bed 12 and enables dust and other types of debris to easily pass through the vents 313.

Figure 12:
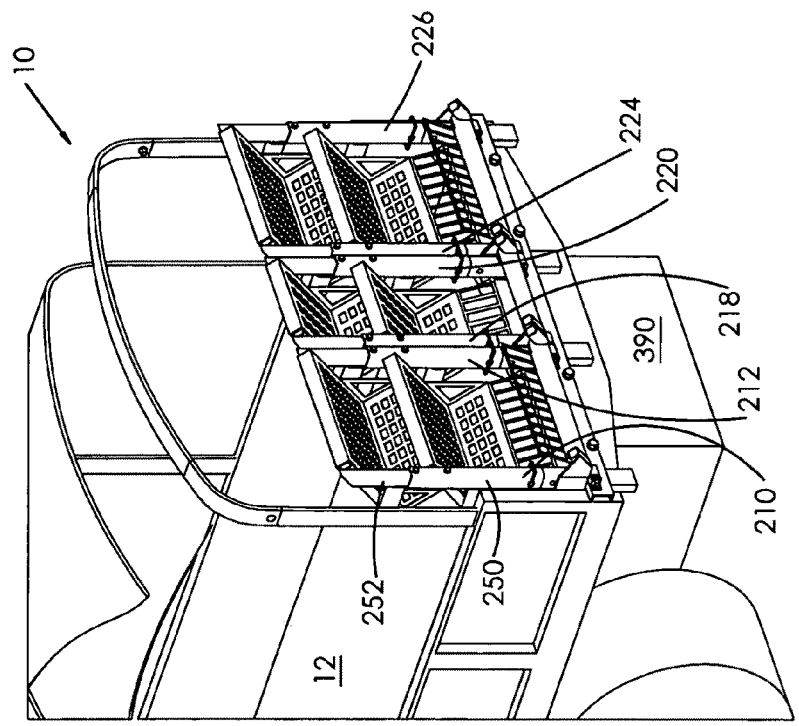
FIG. 12 is a partial perspective view of the selectively movable assembly which is shown in FIG. 1 and further showing the deployment assembly in an alternate stored position, thereby allowing for the protection of items/individuals within bed 12 and allowing the assembly 10 to be airlifted or otherwise transported by other vehicles or assemblies.
Figure 11:
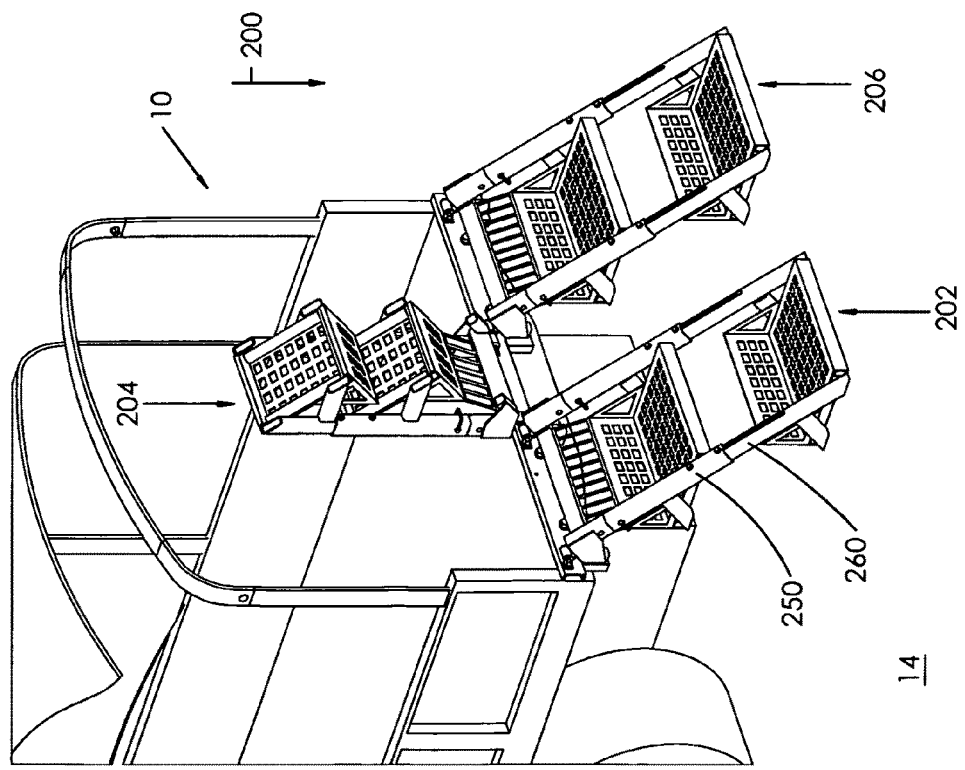
FIG. 11 is a partial perspective view of the selectively movable assembly which is shown in FIG. 1 and further showing the deployment assembly in a partially extended position, thereby, allowing a vehicle and/or other assembly to be towed behind the assembly 10 and behind and/or under stair assembly 204, while still allowing exits and entry out of and into bed 12.
Figure 13:
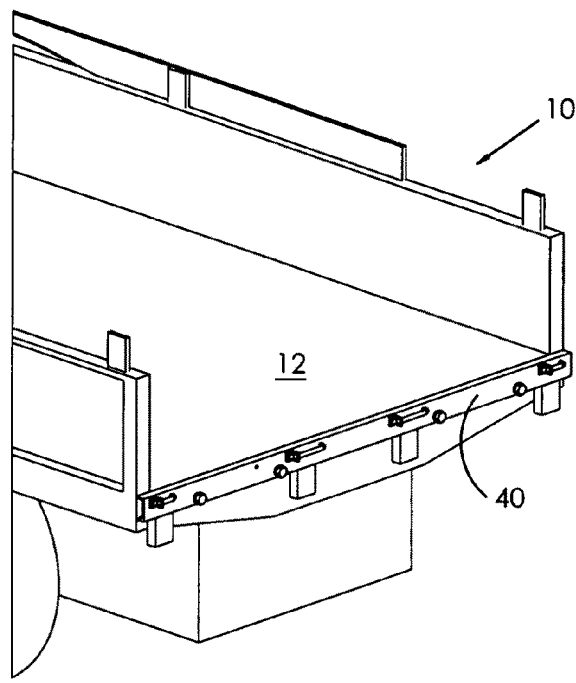
FIG. 13 is a partial perspective view of the selectively movable assembly which is shown in FIG. 1 and only having the universal mounting plate mounted thereon.
Figure 14:
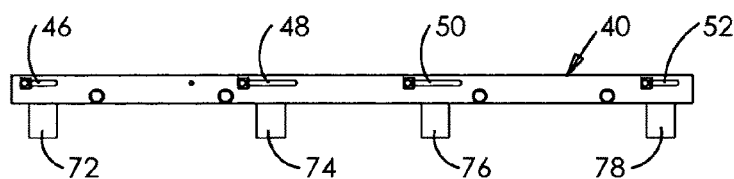
FIG. 14 is a front view of the universal mounting plate which is shown in FIG. 13.
Figure 15:
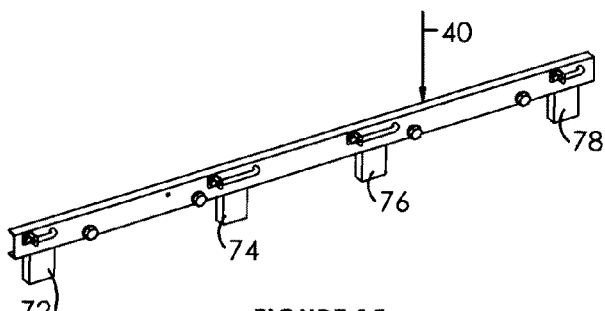
FIG. 15 is a perspective view of the universal mounting plate which is shown in FIG. 14.
Figure 16:
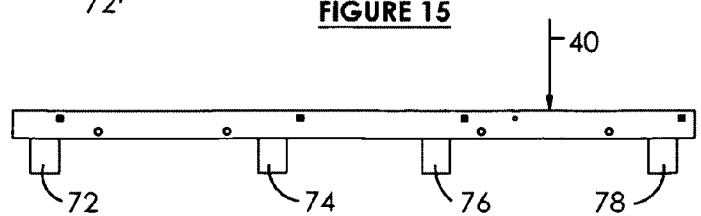
FIG. 16 is a back view of the universal mounting plate which is shown in FIG. 14.
Figure 17:
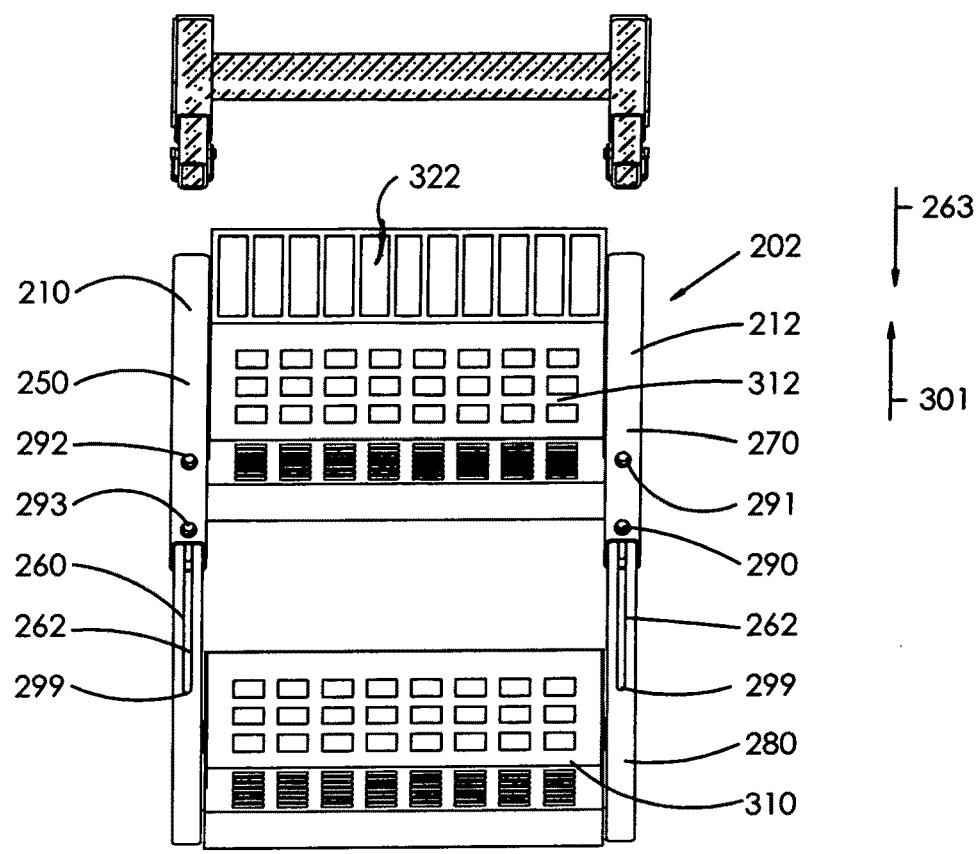
FIG. 17 is a front unassembled view of the deployment assembly which is shown in FIG. 1.
Figures 18, 19:
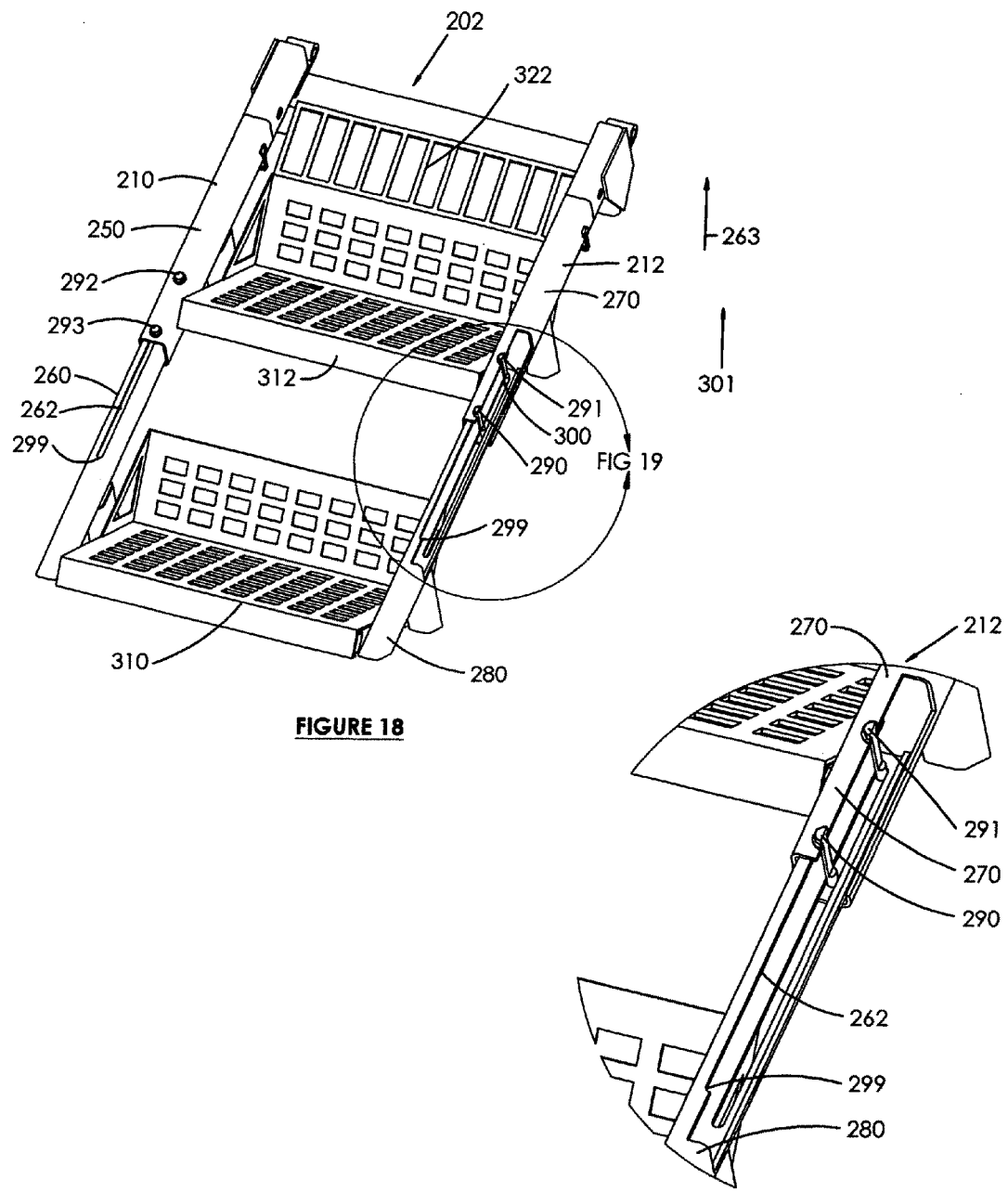
FIG. 18 is a perspective view of a portion of the stairs assembly which is shown in FIG. 1.
FIG. 19 is a partial exploded view of the stairs assembly which is shown in FIG. 18 and taken within view area "19".
Figure 20:
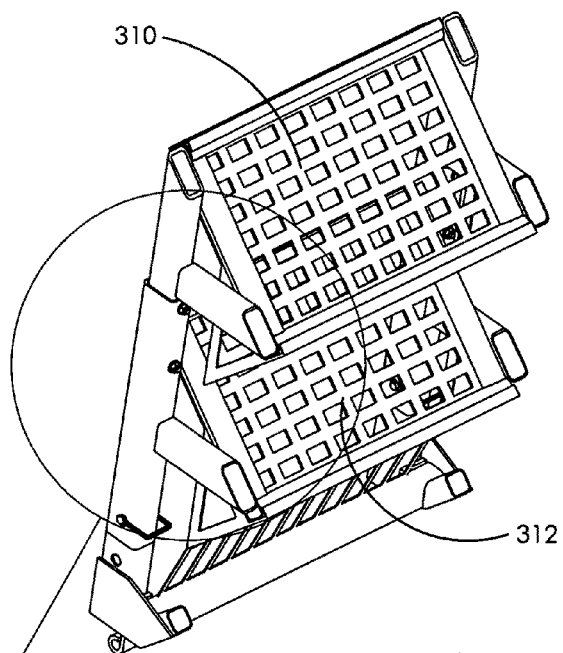
FIG. 20 is a perspective back view of a portion of the stairs assembly which is shown in FIG. 1.
Figure 21:
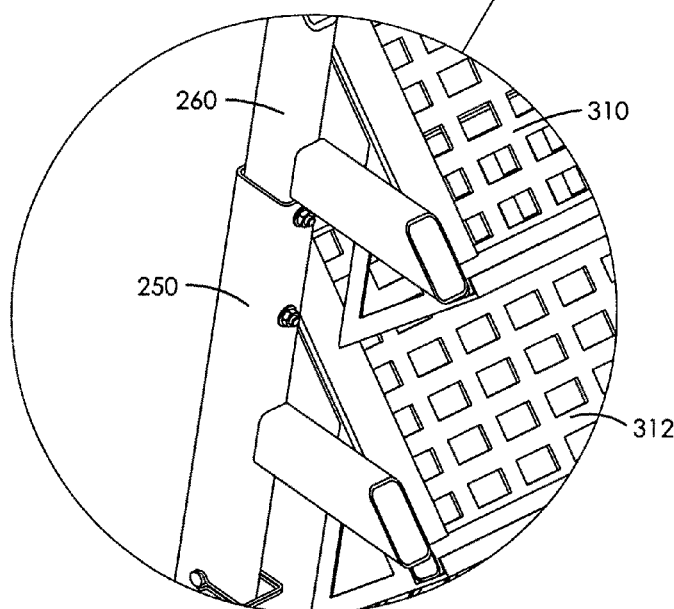
FIG. 21 is an exploded partial view of the stairs assembly which is shown in FIG. 20 and taken within view area "21".
Figure 22:
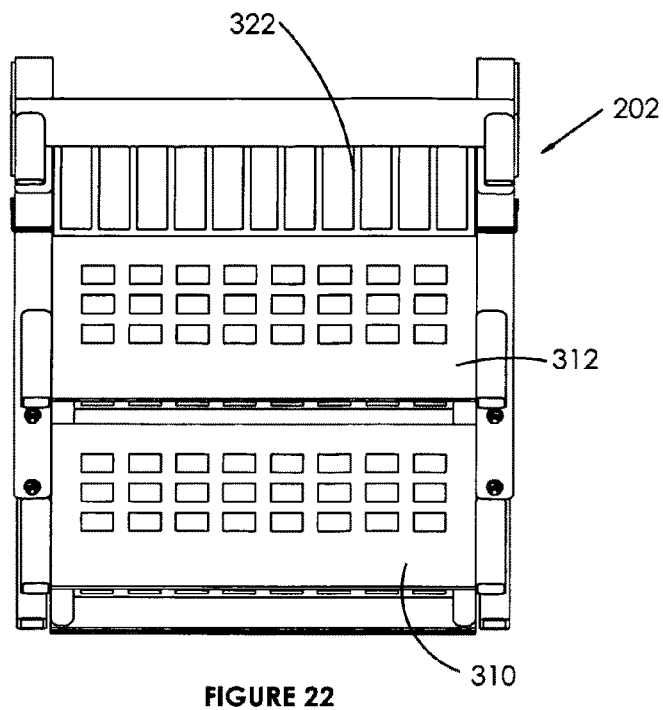
FIG. 22 is a partial back view of the stairs assembly which is shown in FIG. 1 and shown in a selectively retracted position.
Figure 23:
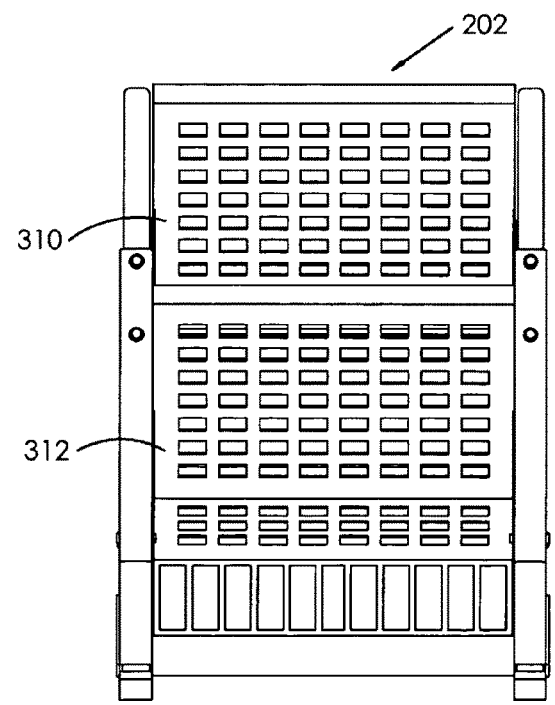
FIG. 23 is a view similar to that which is shown in FIG. 22, but shown in a selectively deployed position.

Thus, when the stair assembly 202 is selectively placed in an extended position, the steps 310, 312 are positioned in a spaced apart manner (see, for example, FIG. 18), and when the stair assembly 202 is selectively placed in a retracted position, the step 310 is made to come closer together (see, for example, FIG. 12). It should be appreciated that the foregoing discussion with respect to stair assembly 202 applies equally well and is fully descriptive of the stair assemblies 204, 206. Each stair assembly 202, 204, 206 is independently movable upon the receiver 100 (the term "independent" means that each stair assembly 202, 204, and 206 can be moved without causing or requiring movement of any of the other stair assemblies 202, 204, 206). Each stair assembly 202, 204, 206 may also be independently extended and retracted, as desired and rotated by use of the receiver assembly 100.

In operation, the stair assemblies 202, 204, and 206 can be selectively and independently extended to allow efficient egress and ingress out of and into the bed 12. When it is not longer desired to allow or have such ingress or egress, the stair assemblies can be selectively and independently rotated away from the ground 14 to facilitate storage or towing behind the assembly 12 (such as upon surface 390 by the use of a hitch (not shown) or the like). In this "rotated position", as is shown in FIG. 12, the stair assemblies 202, 204, and 206 cooperatively function as a traditional tailgate and protect the occupants and/or materials residing upon the bed 12.

Thus, it should be appreciated that there are actually two separate tailgate type configurations. First, as is best perhaps shown in FIGS. 1, 4, 11, the assemblies 202, 204, 206 may be simply rotated toward the bed 12 to provide a barrier for the occupants/items residing in bed 12.

However, in a second non-limiting configuration, member 210 maybe placed into member 106 while member 212 may be placed into member 104; member 218 may be placed into member 110, member 220 may be placed into member 108; member 224 may be placed into member 114; and member 226 may be placed into member 112. Thus, in this non-limited configuration as shown best in FIG. 12, there is formed another tailgate configuration which not only protects items/personnel within bed 12 but facilitates close storage behind the assembly 10 in close proximity to surface 390, thereby allowing assembly 10 to be easily airlifted or otherwise transported.

Figure 27:
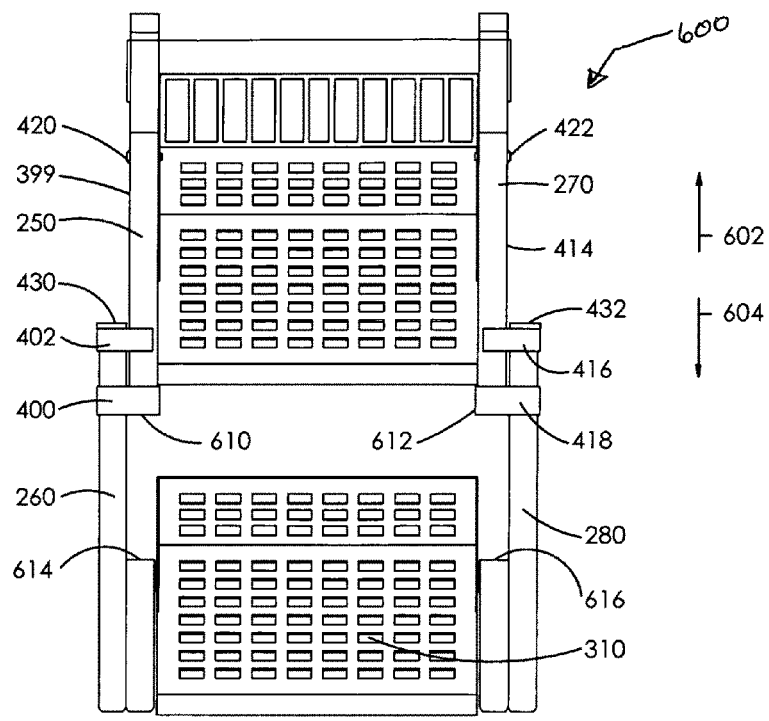
FIG. 27 is a front partial view of a stairs assembly which is made in accordance with the teachings of another alternate embodiment of the invention, and shown in a selectively deployed position.
Figure 28:
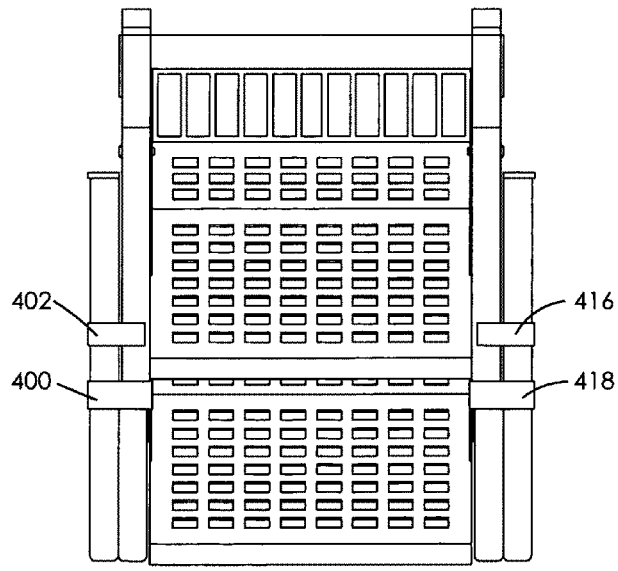
FIG. 28 is a view which is similar to that which is shown in FIG. 27, but shown in a selectively retracted position.

In another non-limiting and alternate embodiment of the invention, as is best perhaps shown in FIGS. 27 and 28, a stair assembly 600 is shown. The stair assembly 600 differs from stair assembly 202 in several ways. That is, the portion 260 does not movably reside within portion 250 and the portion 280 does not movably reside within portion 270. Rather, portion 260 is movably coupled to the outside surface 399 of portion 250 by the use of clips 400, 402 and portion 280 is coupled to the outside surface 414 of portion 270 by the use of clips 416, 418. Bolts 420, 422 are respectively positioned within the portions 250, 270 to attach stair assembly 600 to a receiver, such as receiver members 104, 106. Step 310 selectively moves in directions 602, 604 by having member 260, 260 respectively move over members 250, 270. Such directional movement is limited when respective surfaces 610, 612 engage surfaces 614, 616.

Figure 24:
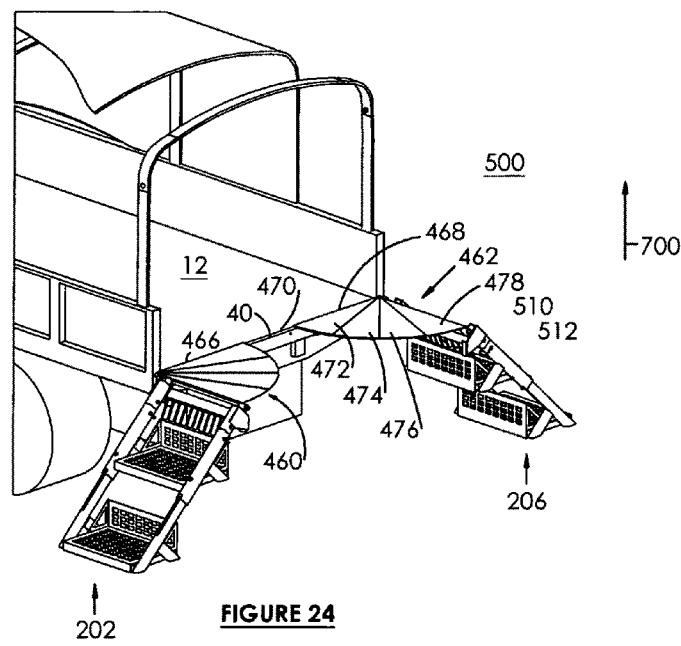
FIG. 24 is a partial perspective view of a selectively movable assembly which incorporates a deployment assembly which is made in accordance with the teachings of an alternate embodiment of the invention.
Figure 25:
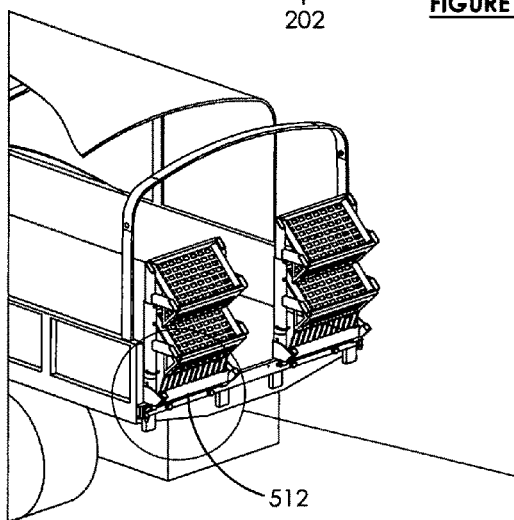
FIG. 25 is a partial perspective view of the selectively movable assembly which is shown in FIG. 24, but further showing the deployment assembly in a selectively stored position.
Figure 26:
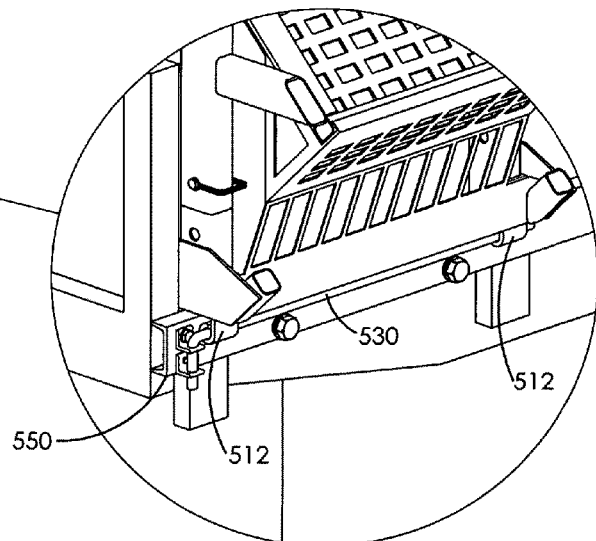
FIG. 26 is a partial perspective view of the selectively movable assembly which is shown in FIGS. 24 and 25 and taken within view area "26".

In yet another alternate embodiment, as shown in FIGS. 24-26 only stair assemblies 202, 206 are utilized and the use of the receiver assembly 100 is obviated. Particularly, upon the universal mounting plate 40, are a pair of substantially identical assemblies 460, 462 have a respective edge 466, 468 which is welded or otherwise fastened to the top edge 470 of the universal mounting plate 40. Each assembly 460,462 includes a plurality of segments 472, 474, 476, and 478 and the respective segment 478 of respective assemblies 460, 476 is respectively coupled to stair assemblies 202, 206. A descriptive discussion will now ensure with respect to assembly 462. However, it should be appreciated that the following discussion of assembly 462 is equally descriptive with respect to assembly 460.

With regard to assembly 462, segment 472 is movably coupled to the segment 470 and is movable from a first position in which the segment 472 wholly fits or resides underneath of the segment 472 to an extended position shown in FIG. 24. Segment 474 is movably coupled to the segment 472 and is movable from a first position in which the segment 474 wholly fits or resides underneath of segment 472, to a fully extended position which is shown in FIG. 24. Segment 476 is movably coupled to the segment 474 and is movable from a first position in which the segment 476 wholly resides or fits underneath of segment 474, to a fully extended position which is shown in FIG. 24. Segment 478 is movably coupled to the segment 476 and is movable from a first position in which the segment 478 is wholly fixed or positioned underneath of segment 476, to an extended position which is shown in FIG. 24. When the segments 472-478 of assembly 462 are each selectively moved to a respective fully extended position, then the stair assembly 204 is moved to the side 500 of the assembly 10, as shown in FIG. 24 and individuals may gain access to the bed 12 by walking upon the stair assembly 204 and the assembly 462.

The stair assembly 206 is pivotally coupled to the edge 510 of segment 478 by hinges 512. That is, member 512 may selectively rotate with respect to the edge 510 because hinges 512 (formed upon the assembly 206) are coupled to the edge 510 by a pin 530. The hinges 512 rotate about the pin 530 and the pin 530 may selectively and removably placed into fastener 550 when such movement is not desired. Thus, the assemblies 460, 462 each function as "hand fans" and are selectively retractable and extendable, thereby allowing the stair assemblies 202, 206 to be selectively positioned in a desired manner with respect to the bed 12. Further, when the assemblies 460, 462 are each placed into a selectively closed position, the stair assemblies 202, 206 may be rotated upwards, in the direction 700 and stored (the pin 530 of each assembly 202, 206 may then be locked).

It is to be understood that foregoing inventions are not limited by the exact construction or methodology which has been described above, but that various changes and modifications may be made without departing from the spirit and the scope of the inventions as they may be respectively delineated in the following claims. Thus, the assembly 16 allows for the rapid and efficient existing and entry from bed 12 due to the use of three independent step assemblies 202, 204, 206; allows for the towing of another vehicle or assembly by allowing each assembly 202, 204, 206 to be selectively placed in an upright or retracted/stored position, thereby also facilitating the efficient transportation of the assembly 10 itself (e.g., such as in an airplane). The other embodiments provide similar benefits.

What is claimed is:

1. A selectively movable assembly comprising a bed and wherein said selectively movable assembly further having an outer surface which lies below and outside of said bed; and a deployment assembly having a mounting plate which solely resides upon said outer surface and outside of said bed and wherein said deployment assembly further comprises a receiver assembly which is movably coupled to said mounting plate and which includes a plurality of protruding members; and a plurality of step assemblies which are each coupled only to said receiver assembly and which are independently and selectively rotatable with respect to said mounting plate in directions toward and away from said bed, and which are independently and selectively extendible from a respective first closed position to a respective second extended position and wherein said plurality of protruding members cooperatively and simultaneously engage said mounting plate to cooperatively limit the amount by which said plurality of step assemblies maybe selectively moved away from said bed.

2. A deployment assembly comprising a mounting plate having first and second opposed flat surfaces and wherein a plurality of generally tubular projections are formed upon said first flat surface and wherein each of said tubular projections each include a tubular body and each of said tubular bodies are substantially identical, are deployed above said first flat surface, and are aligned; a receiver portion having a first generally tubular member which includes a plurality of hinges and wherein each of said plurality of hinges respectively receives a unique one of said tubular bodies, effective to allow said receiver to selectively rotate toward and away from said mounting plate and wherein said receiver further includes a plurality of substantially identical hollow projections, wherein each of said plurality of substantially identical hollow projections being respectively proximate to a unique one of said hinges and having respective axes of symmetry which are parallel to said first flat surface; and a step assembly having first and second projections which are respectively deployed within a first and a second of said plurality of substantially identical hollow projections and further having third and fourth members which are respectively received by and movably coupled to said first and second projections and which are movable from a respective first position in which said third and fourth members are respectively and wholly received by said first and second projections to a second extended position in which said third and fourth projections are respectively extended from said first and second projections, and wherein said step assembly further includes a plurality of steps which are coupled to said third and fourth projections.

3. The deployment assembly of claim 2 wherein said mounting plate further comprises a plurality of generally rectangular support portions.

4. The deployment assembly of claim 3 wherein said receiver portion includes a plurality of generally hollow and rectangular protrusions.

5. The deployment assembly of claim 4 wherein said plurality of generally hollow and rectangular protrusions engage each engage said mounting plate when said receiver selectively rotates toward said mounting plate, thereby cooperatively limiting the amount by which said receiver may rotate toward said mounting plate.

6. A method of effectuating movement to and from a bed of a selectively movable assembly comprising the steps of placing a mounting plate upon a surface of said selectively movable assembly which is located beneath and outside of said bed; coupling a receiver to said mounting plate, effective to allow said receiver to rotate about said mounting plate; providing protrusions upon said receiver, effective to cause said protrusions to selectively engage said surface, thereby limiting the amount of rotation of said receiver; providing a selectively extendable step assembly; and coupling said selectively extendable step assembly to said receiver, thereby allowing said step assembly to be selectively rotated and extended into a first movement position and to allow said step assembly to be selectively rotated and compressed into a second stored position.

7. The method of claim 6 wherein said step assembly comprises a first portion; and a second portion is movably received within said first portion.

* * * * *